United States Patent [19]

Amano

[11] Patent Number: 4,963,413
[45] Date of Patent: Oct. 16, 1990

[54] UNITED PRODUCT COMPOSED OF GLASS PLATE AND VINYL CHLORIDE RESIN MOLDED BODY AND METHOD OF PRODUCING THE SAME

[75] Inventor: Katsuyuki Amano, Aichi, Japan

[73] Assignee: Tokai Kogyo Kabushiki Kaisha, Oobu, Japan

[21] Appl. No.: 326,563

[22] Filed: Mar. 21, 1989

[30] Foreign Application Priority Data

Aug. 27, 1988 [JP] Japan .................................. 63-213285

[51] Int. Cl.$^5$ ............................................. B32B 3/00
[52] U.S. Cl. ...................................... 428/192; 428/446; 428/447; 428/474.4; 428/476.3; 525/431; 528/26; 528/28
[58] Field of Search ............... 428/201, 203, 210, 429, 428/435, 415, 414, 447, 451, 446, 476.3, 474.4, 522, 192, 31, 122; 525/431; 528/26, 28

[56] References Cited

U.S. PATENT DOCUMENTS 4,813,733 3/1989 Gustefson et al. .................. 428/122

FOREIGN PATENT DOCUMENTS 0449596 5/1969 Japan .
56-99817 8/1981 Japan .
0233132 10/1985 Japan .
63-15716 1/1988 Japan .

Primary Examiner—Patrick Ryan
Attorney, Agent, or Firm—Oblon, Spivak, McClelland, Maier & Neustadt

[57] ABSTRACT

A method of producing a united product composed of a glass plate and a vinyl chloride resin molded body, which comprises the steps of conducting a preliminary treatment of the periphery of the glass plate for enhancing adhesion; applying a polyamide resin adhesive including silane compound to the preliminarily treated periphery of the glass plate; disposing the glass plate within a cavity of an injection mold; injecting a molten vinyl chloride resin around the periphery of the glass plate within the cavity after clamping the injection mold; and cooling the injection mold, thereby bonding the glass plate and the vinyl chloride resin molded body. And a united product having excellent water resisting qualities, which comprises a glass plate; a vinyl chloride resin molded body; and an epoxidated polyamide adhesive.

7 Claims, 4 Drawing Sheets

UNITED PRODUCT COMPOSED OF GLASS PLATE AND VINYL CHLORIDE RESIN MOLDED BODY AND METHOD OF PRODUCING THE SAME

BACKGROUND OF THE INVENTION

1. Field of the invention:

The present invention relates to a united product composed of a glass plate and a vinyl chloride resin molded body having an excellent durability such as heat-resisting and water-resisting qualities as window seal materials in a vehicle, a building and so on, and also relates to a method of producing the same.

2. Description of the Related Arts:

Generally, as shown in FIG. 4, window seal materials have been used as a windshield 91 in an automobile 9, for example.

A window glass 92 is attached to a frame 94 of an automotive body through a rubber elastic body 93 as a sealing material.

However, in the aforementioned conventional window seal materials, when the window glass 92 is attached to the frame 94, it requires a long time and much labor. In other words, the window glass 92 is generally an inorganic nonpolar substance, so adhesion of the rubber elastic body 93 as an organic substance to the periphery of the window glass 92 is difficult.

In view of the foregoing problem in the conventional window seal materials, a method of producing a window seal material which is formed as one body composed of glass and a frame, is disclosed in Japanese Patent Application Laid Open No. 15716/1988, wherein the frame made of rubber, soft vinyl chloride resin, etc. is molded on the periphery of the glass as one body.

The aforementioned producing method is as shown in FIG. 5. Plate glass 10 is disposed within an injection mold 8, then a frame 20 made of rubber, etc. is formed on a periphery 11 of the glass 10 by injection molding. That is, an adhesive 40 is preliminarily applied to the periphery 11 of the glass 10, and the inside part of the periphery 11 on which the adhesive 40 is applied, is nipped with a clip 82 of the injection mold. Thereafter, a rubber material for the frame 20 is injected on the adhesive 40, the outside part of the nipped portion so as to mold the frame 20. Reference numeral 81 in FIG. 5 designates a resin injection opening.

However, in the aforementioned method, the adhesive 40 has previously applied to the periphery 11 of the glass 10 directly, then the rubber material is injected to mold the frame 20, so heat curing of the adhesive 40 requires a long time, i.e. not less than 10 seconds for heating. This is because glass is difficult of adhesion to an adhesive, rubber, a vinyl chloride resin, etc., as its property. That is, a specific type of adhesion which is cured over long time such as an epoxy resin should be used, otherwise glass cannot generally be adhered to rubber, a vinyl chloride resin, etc.

On the other hand, an epoxy resin adhesive of quick curing type, which is denatured by a phenol group, can be used to shorten the heat curing time of an adhesive. However, a phenol group is hydrophilic, so the water-resisting qualities in the aforementioned adhesive of a quick curing type is reduced and the durability is deteriorated.

SUMMARY OF THE INVENTION

In view of the foregoing problems in the conventional arts, the present invention has been achieved. An object of the present invention is to provide a united product composed of a glass plate and a vinyl chloride resin molded body having an excellent durability such as heat-resisting and water-resisting qualities, and a method of producing the same wherein the adhesion of a glass plate and a vinyl chloride resin molded body is conducted in a short time.

According to the present invention, there is provided a method of producing a united product composed of a glass plate and a vinyl chloride resin molded body. This method comprises the steps of conducting a preliminary treatment of the periphery of the glass plate for enhancing adhesion; applying a polyamide resin adhesive composed of a polyamide resin and epoxyalkyl silane to the preliminarily treated periphery of the glass plate; disposing the glass plate within a cavity of an injection mold; injecting a molten vinyl chloride resin around the periphery of the glass plate within the cavity after clamping the injection molds and cooling the injection mold; thereby bonding the glass plate and the vinyl chloride resin molded body.

In this invention, the preliminary treatment is application of a primary agent such as silane compound to the surface of the periphery of the glass plate, or activation by plasma etching on the surface of the periphery of the glass plate (hereinafter referred to as glass). The former method is to spray a solution of an organic solvent and silane compound such as $\gamma$(2-aminoethyl)aminopropyltrimethoxy silane, $\gamma$-(2-aminoethyl)aminopropylmethyldimethoxy silane, $\gamma$-methacryloxypropyltrimethoxy silane, on the glass surface. In the latter method, etching is conducted by discharge, applying high frequency electric field, to decompressed gases, so as to chemically react the glass surface with a radical (which means a chemically active atom, molecule or ion) in the plasma of a low temperature. According to the abovementioned two method, a radical such as OH or H group can be added to the glass surface so as to chemically activate it.

As for a polyamide resin adhesive which comprises the abovementioned silane compound, a polyamide resin which comprises a certain amount of a compound including an olefinoxide group, such as $\gamma$-glucidoxypropyltrimetoxysilane silane or other epoxyalkyl silane, and is soluble in alcohol, can be used. The aforesaid polyamide resin is an intermediate of 6 nylon the molecular weight of which is several thousands to tens of thousands, and is a polymer represented by a chemical formula $[CO-NH-(CH_2)_m]_n$ (wherein m ranges from 6 to 11, and n ranges from 8 to 20).

The aforesaid compound including an olefinoxide group is preferably added in the amount of 0.1–2.0 weight % to polyamide resin solid. When the amount is less than 0.1 weight %, the durability of the polyamide resin adhesive such as heat-resisting or water-resisting qualities is not so good, and when the amount is more than 2.0 weight %, the adhesive becomes hard and difficult of treatment as an adhesive.

The aforesaid polyamide resin adhesive is preferably applied on the surface of the periphery of the glass, where a preliminary treatment has been conducted, in the application thickness of 5–30 $\mu$m, and more preferably in the thickness of 10–5 $\mu$m. So, a sufficient adhesive strength can be attained Heating under pressure in injection molding enables strong adhesion between glass and a vinyl chloride resin in an extremely short time, i.e. in one or a few seconds.

The aforesaid injection molding is conducted by heating a vinyl chloride resin to flow in a heated injection molding cylinder and extruding this resin by an injection ram with a plunger into a mold cavity.

In general, the practicable frequency of the injection is 30–900 times an hour. Injection into a mold is referred as shot.

The aforesaid mold can be divided broadly into two types, that is, a one cavity type and a plural cavity type. In the present invention, the former type is adopted. (See FIGs. 3A through 3F.)

The injection molding is preferably conducted under the following conditions. Pressure in the injection molding cylinder connected to said cavity is not less than 300 kg/cm$^2$. A vinyl chloride resin in the injection molding cylinder is held at a temperature ranging from 170° C. to 200° C. to keep the melting condition. Then, the molten vinyl chloride resin is filled up in a cavity of a mold for not less than one second.

The aforesaid vinyl chloride resin is used together with a plasticizer such as ester phthalate, a stabilizer such as alkylphenol metallic salts, and a filler such as calcium carbonate.

Next, a united product comprises a glass plate; a vinyl chloride resin molded body which is formed on the periphery of the glass as one body by injection molding; and an epoxidated polyamide resin adhesive including silane compound, which lies between the periphery of the glass plate and the vinyl chloride resin molded body. In this united product, the adhesive strength of the glass plate and the vinyl chloride resin molded body is not less than 1.5 kg/cm in 180 degrees peeling strength and not less than 10 kg/cm$^2$ in shear strength. This product has an excellent water-resisting qualities.

The aforesaid vinyl chloride resin molded body has an inside opened groove for holding a window pane or a sheet of glass, etc., and an outside frame portion for attaching to a flange of a vehicle body, etc. (See FIG. 1.)

The aforesaid epoxidation means a reaction to produce the aforesaid olefinoxide group (also referred to as an epoxide) in which an oxygen atom is joined to an olefinic linkage. For example, in a polyamide resin adhesive, it means a reaction of some amine groups (R'NH$_2$) of the polyamide resin with epoxyalkyl silane, as described below.

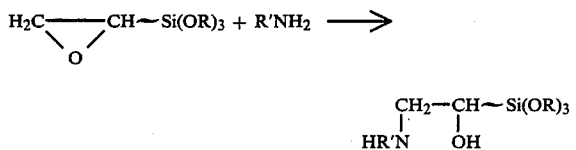

The property of the aforesaid united product composed of glass and a vinyl chloride resin, such as adhesive strength is measured as follows. First, as for 180 degrees peeling strength, a test piece composed of a vinyl chloride resin part and a glass part adhered to each other see FIG. 2) is prepared. Then, each of the vinyl chloride resin part and the glass part is applied with a load to pull in the directions which are opposite each other relative to the horizontal direction, respectively (referred as X and Y, respectively), until the adhesive part becomes detached. The adhesive strength in this case is represented by the load value per unit length in the adhesive part when detached.

Secondly, as for shear strength, it is an adhesive strength measured by a test method to find the maximum load required for shearing the same test piece as described above such as ASTMD732Y-46, BS20761954, for example.

As for the aforesaid water-resisting qualities, the same test piece as described above is immersed in warm water of 40° C. for 240 hours, and then the 180 degrees peeling strength and the shear strength are measured. The test piece retaining 70–80% of the adhesive strength in comparison with the original test piece not subjected to the immersion, is judged to be excellent in the water-resisting qualities.

As for the aforesaid heat-resisting qualities, the same test piece as described above is left for 240 hours at a temperature of 80° C., and then the 180 degrees peeling strength and the shear strength are measured. The test piece retaining 80–90% of the adhesive strength in comparison with the original test piece not subjected to the immersion, is judged to be excellent in the heat resisting qualities.

The durability is also judged by the following heat cycle test in addition to the aforesaid water-resisting and heat-resisting qualities. The test piece which can stand this test is judged to be excellent in durability. In detail, the aforesaid test piece is left for 7.5 hour at a temperature of $-30°$ C., and next it is left for 0.5 hours at room temperature, and then left for 15.5 hours at a temperature of 80° C., lastly left for 0.5 hours at room temperature. After the abovementioned operation is repeated five times, the 180 degrees peeling strength and the shear strength are measured. The test piece retaining 80–90% of the adhesive strength in comparison with the original test piece is judged to stand the test.

In a method of producing a united product composed of glass and a vinyl chloride resin according to the present invention, application of a primary agent or plasma etching is applied to the surface of the periphery of glass. So, a hydroxyl group, a hydrogen group, etc. are stuck to the glass surface so as to chemically activate it.

Accordingly, the glass and the vinyl chloride resin molded body are firmly adhered to each other by a polyamide resin adhesive.

The aforesaid polyamide resin adhesive includes silane compound, so the deterioration of the water-resisting qualities of the adhesive is prevented. As a result, the adhesion between the glass and the vinyl chloride resin molded body by the polyamide resin adhesive is improved, so a united product composed of glass and vinyl chloride resin having an excellent durability such as heat-resisting and water-resisting qualities, etc. can be formed.

On the other hand, a preliminary treatment, i.e. the aforesaid application of a primary agent or the plasma etching is applied to the surface of the periphery of the glass, and an epoxidated polyamide resin adhesive including silane compound can be used in adhesion. So, in this case, heat curing of the adhesive in injection molding can be conducted in an extremely short time, for a period of one or a few seconds.

Thus, according to the method of the present invention, the glass and the vinyl chloride resin molded body can be adhered to each other in a short time, and a united product composed of glass and vinyl chloride resin, which has an excellent durability such as heat-resisting and water-resisting qualities can be obtained.

The aforesaid united product composed of glass and vinyl chloride resin thus obtained has an excellent adhesive strength, i.e. not less than 1.5 kg/cm in 180 degrees peeling strength as described above, and at the same time it has an excellent water-resisting qualities.

BRIEF DESCRIPTION OF THE DRAWINGS

FIG. 1 is a sectional view of the principal part of a united product composed of a glass plate and a vinyl chloride resin. FIG. 2 is a sectional view of the principal part of a test piece for measuring the properties.

DETAILED DESCRIPTION

The invention will now be described more specifically with reference to a plurality of examples.

EXAMPLE 1

A united product composed of glass and vinyl chloride resin and a method of producing the same according to the present invention will be explained in connection with FIGS. 1 and 2.

A united product of the present invention comprises plate glass 1, a preliminary treating layer which is applied to the surface of the periphery of the glass 1, a polyamide resin adhesive 4 which is applied on the preliminary treating layer 3, and a vinyl chloride resin molded body 2 which is joined to the polyamide resin adhesive 4. In FIG. 1, the thickness of the preliminary treating layer 3 and the polyamide resin adhesive 4 is magnified.

The glass 1 is an automotive window glass and is made of tempered glass having a thickness of 3.5 mm. The preliminary treating layer 3 is formed on the periphery of the glass 1 by spraying a solution of silane compound in an organic solvent thereon.

As the aforesaid silane compound, γ-(2-aminoethyl)aminopropyltrimethoxy silane, a kind of epoxyalkyl silane, is used. The silane compound is used as the following composite solution.
silane compound . . . 2.5%
binder (polyvinyl alcohol) . . . 0.5%
lublicating oil (fatty acid amine) . . . 0.5%
antistatic agent (ammonium compound) . . . 0.5%
solvent (water+ethyl alcohol) . . . 96%

The total amount is 100% (all caliculated by weight).

Next, the aforesaid composite solution is sprayed to form the preliminary treating layer 3 having a thickness of 12 μm.

The aforesaid polyamide resin adhesive 4 is formed on the preliminary treating layer 3 by spray coating. As the polyamide resin adhesive 4, a polyamide resin which is an intermediate of 6 nylon is used. Further, the polyamide resin which is soluble in ethyl alcohol and of which the molecular weight is about ten thousand is used. And γ-glycid oxypropyltrimethoxy silane, a kind of epoxyalkyl silane is added to the polyamide resin in the amount of 0.5 weight % for epoxidation, thereby obtaining the polyamide resin adhesive including silane compound. This adhesive is improved in water-resisting qualities.

The aforesaid vinyl chloride resin molded body 2 is produced by the following process. The glass 1 provided with the preliminary treating layer 3 and the polyamide resin adhesive 4 on the periphery thereof as described above, is set within an injection mold. Then, after the injection mold is clamped, the molten vinyl chloride resin is injected to the periphery of the glass 1 (see FIGS. 3A through 3F).

As the vinyl chloride resin, the following composition is adopted.
vinyl chloride resin powder . . . 50%
plasticizer(phthalic acid ester) . . . 40%
stabilizer (alkylphenol metallic salt) . . . 2%
fillers and the other (calcium carbonate, antioxidant, etc.) . . . 8%

The total amount is 100% (all calculated by weight).

Figure 1:
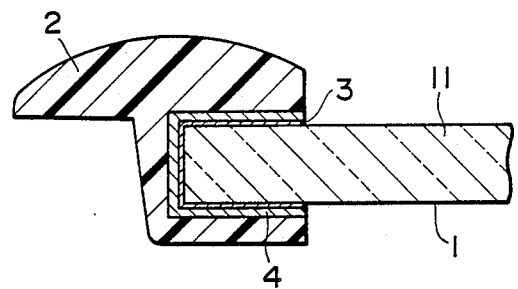
FIGS. 1-2 show a united product composed of a glass plate and a vinyl chloride resin in EXAMPLES 1—3.

The aforesaid vinyl chloride resin is reacted with the aforesaid polyamide resin adhesive with heat curing by heating under pressure in the injection mold so as to form a certain shape as shown in FIG. 1 by injection molding. Then, the glass 1 and the vinyl chloride resin molded body are adhered with each other as one body to form a united product.

A united product composed of a glass plate and a vinyl chloride resin molded body in this example is produced through each of the steps shown in FIGS. 3A through 3F.

Figure 3A:
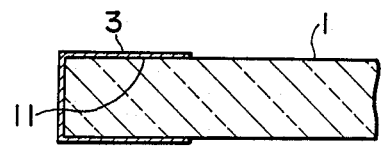
FIGS. 3A through 3F are process charts illustrating a producing method.
Figure 3B:
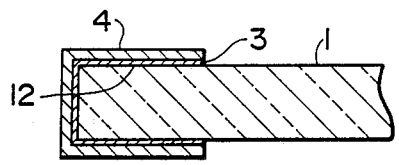

A step shown in FIG. 3A is a process of applying a preliminary treating layer 3 to a periphery part 11 of glass 1 for the purpose of strengthening adhesion A step shown in FIG. 3B is a process of applying a polyamide resin adhesive 4 including silane compound to a portion 12 Provided with the preliminary treating layer 3.

Figure 3C:
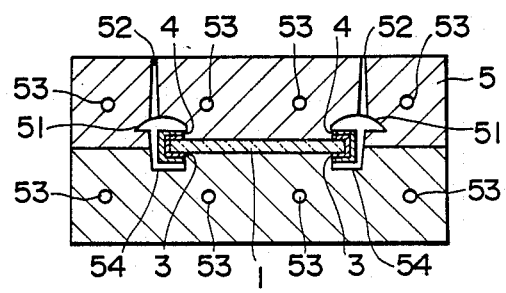

A step shown in FIG. 3C is a process of setting the lass 1 applied with the polyamide resin adhesive 4 within an injection mold 5.

Figure 3D:
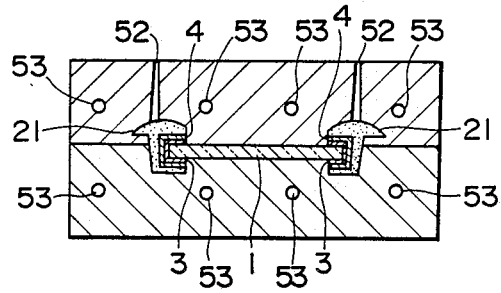

A step shown in FIG. 3D is a process of injecting a molten vinyl chloride resin 21 through a resin injection opening 52 to the periphery of the glass 1 after clamping the injection mold 5. In this step, heat curing reaction of the aforesaid polyamide resin adhesive is conducted by using the applied pressure and the heat of the molten vinyl chloride resin. The molten vinyl chloride resin 21 is resin material which composes a vinyl chloride resin molded body 2 having a predetermined shape on the periphery of the glass 1.

Figure 3E:
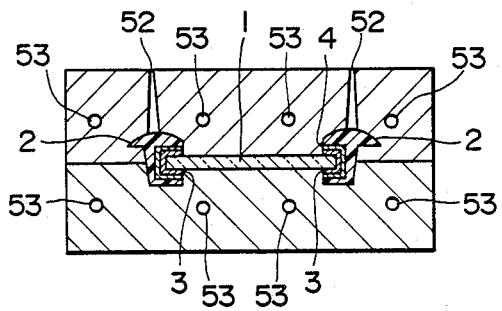

A step shown in FIG. 3E is a process of cooling and fixing the molten resin which is injected and filled in a cavity of the injection mold so as to enable to take it out therefrom. Reference numeral 53 designates a warm water pipe for heating the injection mold.

Figure 3F:
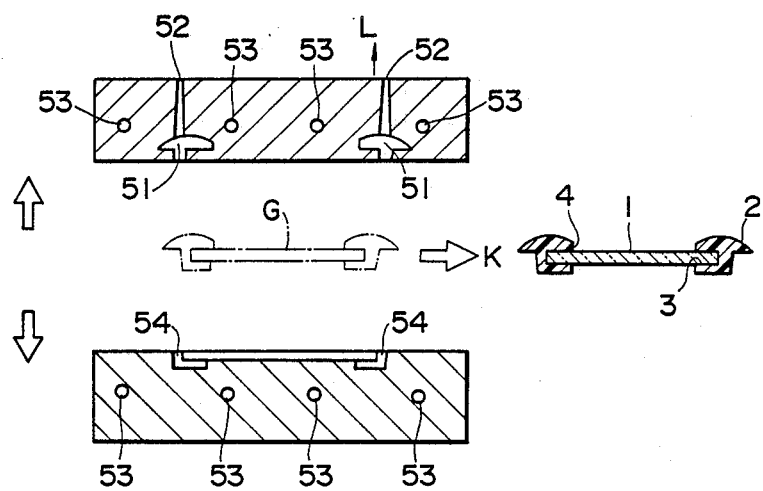
Figure 4:
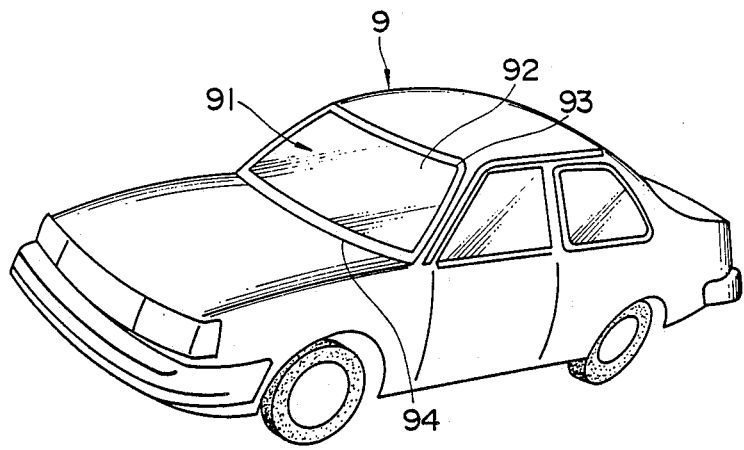
FIG. 4 is a perspective view of an automobile.
Figure 5:
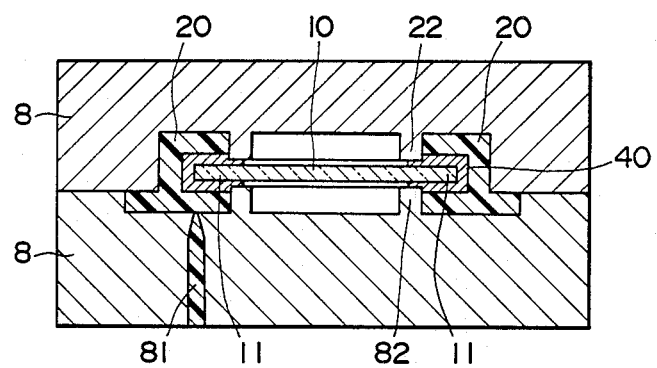
FIG. 5 is a sectional side elevation view of a conventional injection mold.

A step shown in FIG. 3F is a process of taking out a united product G in the direction designated by an arrow K by opening the molds 51 and 54 in the direction L.

The method of producing a united product composed of a glass plate and a vinyl chloride resin is constructed as described above, so the following effects is presented.

The glass 1 has a preliminary treating layer 3 provided on the surface of the periphery thereof. So, the number of hydroxyl group or hydrogen group on the surface of the glass 1 is increased so as to cause chemical activation of the surface for the purpose of strengthening adhesion. Accordingly, the adhesive strength of the glass 1 and the vinyl chloride resin molded body 2 is improved.

In the aforesaid polyamide resin adhesive 4, the polyamide resin is activated by silane compound. So, the durability of the polyamide resin adhesive 4, such as heat-resisting qualities, water-resisting qualities, etc. can be improved.

On the periphery of the glass 1, the vinyl chloride resin is injected within the injection mold, and is heated under pressure at predetermined conditions. Thus, the vinyl chloride resin is molded within the injection mold at the same time as adhered to the glass 1 so as to form a molded body having a predetermined shape as one body with the glass 1 in a short time.

Figure 2:
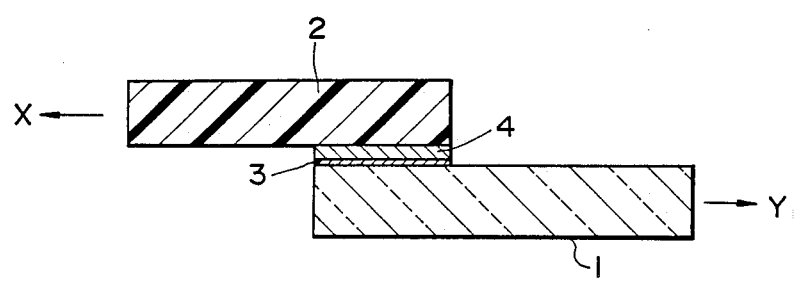

Thus, according to the present invention, there can be provided a united product which is composed of the glass 1 and the vinyl chloride resin molded body 2 adhered to each other in a short time and which has an excellent durability such as heat-resisting and water-resisting qualities, as shown in FIGS. 1 and 2.

Conditions such as injection pressure, temperature in the abovementioned producing method is as shown in Table 1.

Properties such as adhesive strength of the united product are as shown in Table 2. The adhesive strength is measured by using a test piece having a predetermined shape as shown in FIG. 2.

EXAMPLE 2

In this example, plasma etching is used in the step shown in FIG. 3A instead of application of a primary agent in EXAMPLE 1.

The coating thickness of the polyamide resin adhesive 4 in the step shown in FIG. 3B was made 10 μm. In the step shown in FIG. 3E, the pressure within an injection molding cylinder is made 70 kg/cm$^2$. The temperature of an injection mold was made 50° C. The other conditions were same as in EXAMPLE 1.

EXAMPLE 3

In this example, the coating thickness of the polyamide resin adhesive 4 in the step shown in FIG. 3B was made 14 μm.

The temperature of an injection mold was made 40° C. in the step shown in FIG. 3E. The other conditions were same as in EXAMPLE 1.

As the result of the abovementioned three examples, the product in EXAMPLE 2 was the most excellent in 180 degrees peeling strength, and the products obtained in EXAMPLES 1 and 3 followed in this order, as shown in Table 2.

As for shear strength, the united product in EXAMPLE 2 was the most excellent, and secondly the products in EXAMPLES 1 and 3 were equal to each other.

As for water-resisting qualities, the products in EXAMPLES 1 and 3 were excellent and the product in EXAMPLE 2 was a little inferior to the former two.

In a comparative example which was not subjected to the step shown in FIG. 3A, the strength, the water-resisting qualities, etc. were not so good in spite of molding over 12 seconds.

TABLE 1

|  | Injection pressure (kg/cm$^2$) | Mold temp (°C.) | Resin temp (°C.) | Cooling period (sec.) | Molding period (sec.) |
| --- | --- | --- | --- | --- | --- |
| EXAMPLE 1 | 400 | 50 | 180 | 10 | 3 |
| EXAMPLE 2 | 700 | 50 | 180 | 10 | 1 |
| EXAMPLE 3 | 400 | 40 | 180 | 10 | 3 |
| COMPARATIVE EXAMPLE | 400 | 50 | 180 | 10 | 12 |

TABLE 2

|  | Step A | Step B Coating thickness (μm) | 180 degrees peeling strength (kg/cm) | Sheer strength (kg/cm$^2$) | Water-resisting qualities | Heat-resisting qualities | Durability |
| --- | --- | --- | --- | --- | --- | --- | --- |
| EXAMPLE 1 | Application of primary agent | 12 | 1.8 | 12 | 85% held | Not lowered | Not lowered |
| EXAMPLE 2 | Plasma etching | 10 | 2.0 | 16 | 80% held | Not lowered | Not lowered |
| EXAMPLE 3 | Application of primary agent | 14 | 1.7 | 12 | 85% held | Not lowered | Not lowered |
| COMPARATIVE EXAMPLE | — | 25 | 0.5 | 7 | 60% held | 50% held | 70% held |

What is claimed is:

1. A united product having excellent water-resisting qualities comprising:
   a glass plate;
   a vinyl chloride resin molded body which is formed on the periphery of said glass plate as one body by injection molding; and
   a polyamide resin adhesive obtained by reaction of polyamide resin and epoxyalkyl silane, which lies between the periphery of said glass plate and said vinyl chloride resin molded body;
   the adhesive strength of said glass plate and said vinyl chloride resin molded body being not less than 1.5 kg/cm in 180 degrees peeling strength and not less than 10 kg/cm$^2$ in shear strength.

2. A method of producing a united product composed of a glass plate and a vinyl chloride resin molded body comprising the steps of:
   conducting a preliminary treatment of the periphery of said glass plate for enhancing adhesion;
   applying a polyamide resin adhesive composed of a polyamide resin and epoxyalkyl silane to the preliminary treated periphery of said glass plate;
   disposing said glass plate within a cavity of an injection mold;

injecting a molten vinyl chloride resin around the periphery of said glass plate within said cavity after clamping said injection mold; and
cooling said injection mold;
thereby bonding said glass plate and said vinyl chloride resin molded body.

3. A method according to claim 2 wherein said preliminary treatment is application of a solution of an organic solvent and silane compound to the surface of the periphery of said glass plate, or plasma etching on the surface of the periphery of said glass plate.

4. A method according to claim 2, wherein said polyamide resin adhesive is composed of said epoxyalkyl silane and a polymer which is an intermediate of said polyamide resin and is represented by a chemical formula $[CO-NH-(CH_2)_m]_n$ wherein m ranges from 6 to 11 and n ranges from 8 to 20.

5. A method according to claim 4, wherein said epoxyalkyl silane is added in the amount of 0.1-2.0 weight % to said polyamide resin solid.

6. A method according to claim 2, wherein the pressure in an injection molding cylinder connected to said cavity is not less than 300 kg/cm$^2$, and said vinyl chloride resin in a thermofusion state by heating at a temperature of 170-200° C. is injected within said cavity is not less than 1 second.

7. A method according to claim 2, wherein said epoxyalkyl silane is γ-glycidoxypropyltrimetoxysilane.

* * * * *